(12) United States Patent
Park et al.

(10) Patent No.: US 11,009,769 B2
(45) Date of Patent: May 18, 2021

(54) OPTICAL MODULATION DEVICE AND APPARATUS INCLUDING THE SAME

(71) Applicant: SAMSUNG ELECTRONICS CO., LTD., Suwon-si (KR)

(72) Inventors: Junghyun Park, Seoul (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 228 days.

(21) Appl. No.: 16/192,967

(22) Filed: Nov. 16, 2018

(65) Prior Publication Data
US 2019/0384138 A1    Dec. 19, 2019

(30) Foreign Application Priority Data
Jun. 15, 2018    (KR) .................. 10-2018-0069063

(51) Int. Cl.
  *G02F 1/29*    (2006.01)
  *G01S 7/481*    (2006.01)

(52) U.S. Cl.
  CPC ............ *G02F 1/292* (2013.01); *G01S 7/4817* (2013.01)

(58) Field of Classification Search
  CPC .... G02F 1/292; G02F 2202/30; G01S 7/4817; G02B 26/0833
  See application file for complete search history.

(56) References Cited

U.S. PATENT DOCUMENTS

| 7,068,234 B2 * | 6/2006 | Sievenpiper ............. H01Q 3/26 343/745 |
| 9,632,216 B2 | 4/2017 | Han et al. |
| 2007/0058145 A1 | 3/2007 | Bleeker |
| 2017/0031183 A1 | 2/2017 | Han et al. |
| 2017/0176651 A1 | 6/2017 | Lee et al. |

(Continued)

FOREIGN PATENT DOCUMENTS

| EP | 3179297 A1 * | 6/2017 | ............ H01L 29/24 |
| EP | 3324235 A1 | 5/2018 | |

(Continued)

OTHER PUBLICATIONS

Communication dated Nov. 7, 2019, from the European Patent Office in counterpart European Application No. 19164121.6.

(Continued)

*Primary Examiner* — Robert E. Tallman
(74) *Attorney, Agent, or Firm* — Sughrue Mion, PLLC

(57) ABSTRACT

Provided are an optical modulation device and an apparatus including the same. The optical modulation device may include a plurality of reflectors located on a driving circuit substrate, a plurality of nano-antennas located on the plurality of reflectors, and an active layer located between the plurality of reflectors and the plurality of nano-antennas and patterned to have a plurality of openings. The optical modulation device may further include a plurality of first connection members configured to electrically connect the driving circuit substrate to the plurality of reflectors and a plurality of second connection members configured to electrically connect the driving circuit substrate to the plurality of nano-antennas. The plurality of second connection members may be connected to the plurality of nano-antennas through the plurality of openings.

24 Claims, 19 Drawing Sheets

(56) References Cited

U.S. PATENT DOCUMENTS

2018/0048116 A1 2/2018 Adachi et al.
2018/0136537 A1 5/2018 Kim et al.

FOREIGN PATENT DOCUMENTS

EP 3428695 A1 1/2019
JP 6124293 B2 5/2017

OTHER PUBLICATIONS

Kaifeng Shi et al. "Optical modulators and beam steering based on electrically tunable plasmonic material" Journal of Nanophotonics, vol. 9, No. 1, Jan. 2015, (17 pages total) XP060053807.
Viktoriia E. Babicheva et al. "Plasmonic modulator optimized by patterning of active layer and tuning permittivity" Optics Communications, vol. 285, No. 24, Nov. 1, 2012, (11 pages total) XP055498810.

* cited by examiner

OPTICAL MODULATION DEVICE AND APPARATUS INCLUDING THE SAME

CROSS-REFERENCE TO RELATED APPLICATION

This application claims priority from Korean Patent Application No. 10-2018-0069063, filed on Jun. 15, 2018, in the Korean Intellectual Property Office, the disclosure of which is incorporated herein in its entirety by reference.

BACKGROUND

1. Field

Apparatuses consistent with example embodiments relate to optical modulation devices and apparatuses including the same.

2. Description of the Related Art

Optical devices for changing the transmission/reflection characteristics, phase, amplitude, polarization, intensity, path, etc. of light are used in various different optical apparatuses. Optical modulators having various structures have been proposed to control such properties of light in a desired manner in optical systems. For example, liquid crystals having optical anisotropy or microelectromechanical system (MEMS) structures using micro-mechanical movements of light blocking/reflecting devices are used in many optical modulators. Such optical modulators have the disadvantage of a slow operation response time (e.g., several μs or more) due to characteristics of the driving method.

Recently, attempts have been made to apply nano-structures, using surface plasmon resonance stimulated by incident light, to optical devices.

SUMMARY

One or more example embodiments may provide optical modulation devices having excellent performance and capable of non-mechanically modulating light. One or more example embodiments may provide optical modulation devices having double electrode structures including driving circuit units having active matrix structures. One or more example embodiments may provide non-mechanical optical modulation devices for increasing operating speeds (reaction rates). One or more example embodiments may provide optical apparatuses including the optical modulation devices.

Additional example aspects and advantages will be set forth in part in the description which follows and, in part, will be apparent from the description, or may be learned by practice of the presented example embodiments.

According to an aspect of an example embodiment, an optical modulation device includes: a driving circuit substrate; a plurality of reflectors located on the driving circuit substrate; a plurality of nano-antennas located on the plurality of reflectors; an active layer located between the plurality of reflectors and the plurality of nano-antennas and patterned to have a plurality of openings; a first insulating layer located between the plurality of reflectors and the active layer; a second insulating layer located between the active layer and the plurality of nano-antennas; a plurality of first connection members which electrically connect the driving circuit substrate to the plurality of reflectors; and a plurality of second connection members which electrically connect the driving circuit substrate to the plurality of nano-antennas, wherein the plurality of second connection members are connected to the plurality of nano-antennas through the plurality of openings of the active layer.

The active layer may be patterned into a line pattern including a plurality of line layers, wherein the plurality of openings are formed between the plurality of line layers.

The active layer may be patterned into a mesh pattern, wherein the plurality of openings are defined by the mesh pattern.

The active layer may have a grid structure.

The driving circuit substrate may include a plurality of unit cell areas, wherein each of the plurality of unit cell areas may include one or more transistors and one or more capacitors.

Each of the plurality of unit cell areas may have a 2 transistor (T)-2 capacitor (C) structure including two transistors and two capacitors.

Each of the plurality of unit cell areas may include a first sub-area and a second sub-area, wherein the first sub-area may be connected to one of the plurality of reflectors, and the second sub-area may be connected to one of the plurality of nano-antennas.

The first sub-area may have a 1 transistor (T)-1 capacitor (C) structure.

The second sub-area may have a 1T-1C structure.

The driving circuit substrate may include a plurality of unit cell areas, wherein each of the plurality of unit cell areas has a 1 word line (WL)-2 bit line (BL) structure including one word line and two bit lines intersecting the one word line, wherein one of the two bit lines may be electrically connected to one of the plurality of reflectors, and the other one of the two bit lines may be electrically connected to one of the plurality of nano-antennas.

The active layer may include a plurality of active regions, and a first reflector from among the plurality of reflectors may be located under a first active region from the plurality of active regions and a first nano-antenna from among the plurality of nano-antennas may be located over the first active region, wherein the first active region, the first reflector, and the first nano-antenna, together, may constitute one unit device.

An array of the unit devices may be arranged.

The optical modulation device may be configured to independently apply voltages to each of the first reflector and the first nano-antenna with respect to the first active region, or independently apply voltages to each of the first active region, the first reflector, and the first nano-antenna.

The optical modulation device may be configured to independently apply voltages to each of the plurality of reflectors, and independently apply voltages to each of the plurality of nano-antennas.

The optical modulation device may be configured to induce phase modulation of light reflected by the plurality of nano-antennas.

The active layer may have a thickness equal to or less than 10 nm.

The optical modulation device may further include a wiring structure electrically contacting the active layer and located in at least one of between the active layer and the first insulating layer and between the active layer and the second insulating layer, wherein the wiring structure may have an electrical conductivity higher than an electrical conductivity of the active layer.

The active layer may include an electro-optic material having a permittivity that varies according to an electrical signal applied to the active layer.

The active layer may include at least one of a transparent conductive oxide and a transition metal nitride.

According to an aspect of another example embodiment, an optical modulation device includes: a driving circuit unit; a plurality of reflectors facing the driving circuit unit; a plurality of nano-antennas located on the plurality of reflectors; an active layer located between the plurality of reflectors and the plurality of nano-antennas; a first insulating layer located between the plurality of reflectors and the active layer; a second insulating layer located between the active layer and the plurality of nano-antennas; a plurality of first connection members which electrically connect the driving circuit unit to the plurality of reflectors; and a plurality of second connection members which electrically connect the driving circuit unit to the plurality of nano-antennas, wherein the driving circuit unit includes a plurality of unit cell areas, and each of the plurality of unit cell areas has a 1 word line (WL)-2 bit line (BL) structure including one word line and two bit lines.

The active layer may be patterned to have a plurality of openings, and the plurality of second connection members may be connected to the plurality of nano-antennas through the plurality of openings.

Each of the plurality of unit cell areas may include a first sub-area and a second sub-area, wherein the first sub-area may be connected to one of the plurality of reflectors, and the second sub-area may be connected to one of the plurality of nano-antennas.

The first sub-area may include one or more transistors and one or more capacitors, and the second sub-area may include one or more transistors and one or more capacitors.

According to an aspect of another example embodiment, an optical apparatus includes the optical modulation device.

The optical apparatus may be configured to steer a beam in a one-dimensional (1D) or two-dimensional (2D) manner by using the optical modulation device.

The optical apparatus may include at least one of a light detection and ranging (LiDAR) apparatus, a three-dimensional (3D) image acquisition apparatus, a holographic display apparatus, and a structured light generating apparatus.

BRIEF DESCRIPTION OF THE DRAWINGS

These and/or other example aspects and advantages will become apparent and more readily appreciated from the following description of the example embodiments, taken in conjunction with the accompanying drawings in which.

DETAILED DESCRIPTION

Figure 1A:
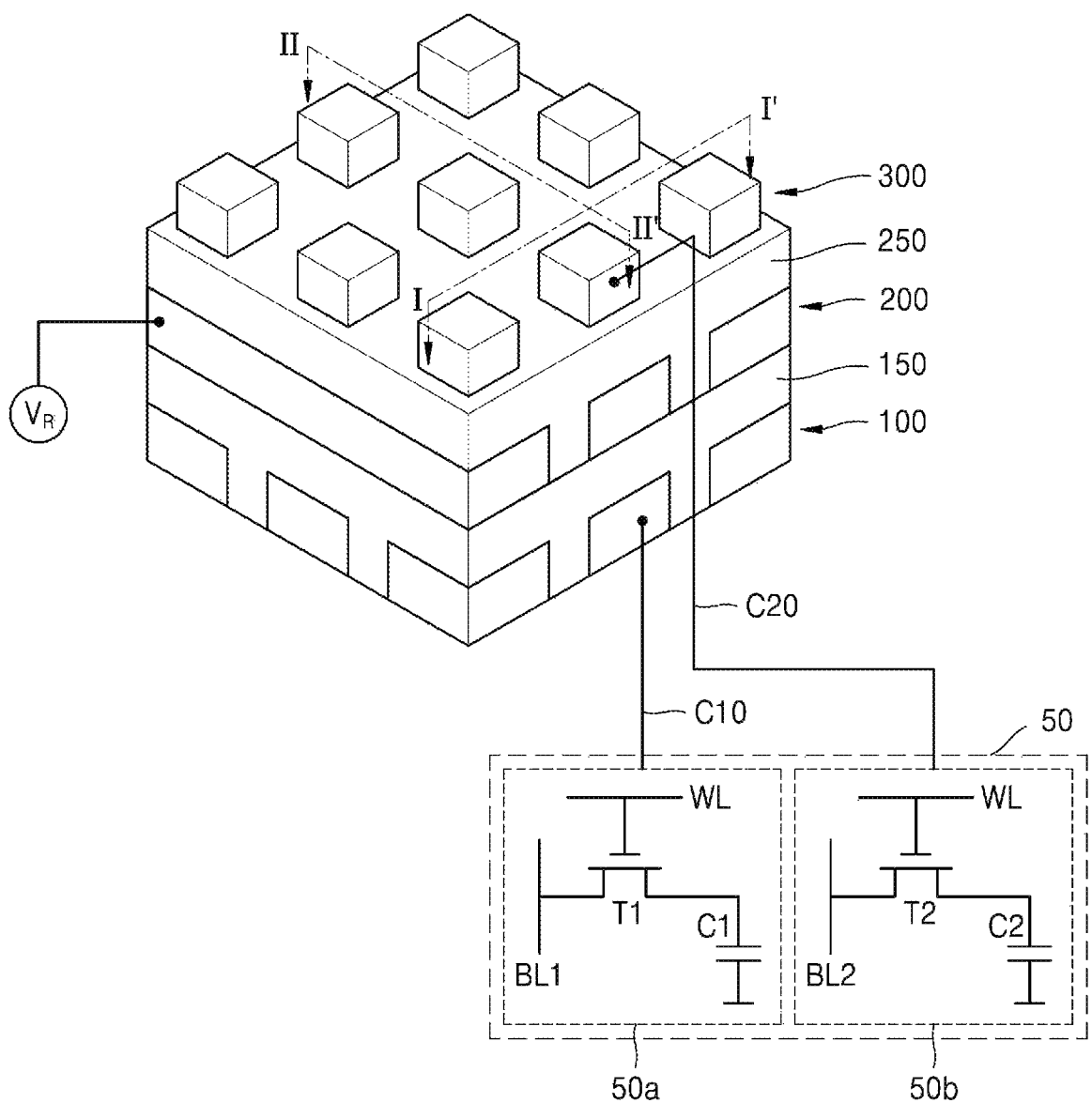
FIG. 1A is a perspective view of an optical modulation device according to an example embodiment.

Various example embodiments will now be described more fully with reference to the accompanying drawings in which example embodiments are shown.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Expressions such as "at least one of", when preceding a list of elements, modify the entire list of elements and do not modify the individual elements of the list.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Optical modulation devices and apparatuses including the same according to example embodiments will now be described in detail with reference to the attached drawings. Widths and thicknesses of layers or regions illustrated in the attached drawings may be exaggerated for clarity and convenience of explanation. The same reference numerals throughout the detailed description denote the same elements.

Figure 1B:
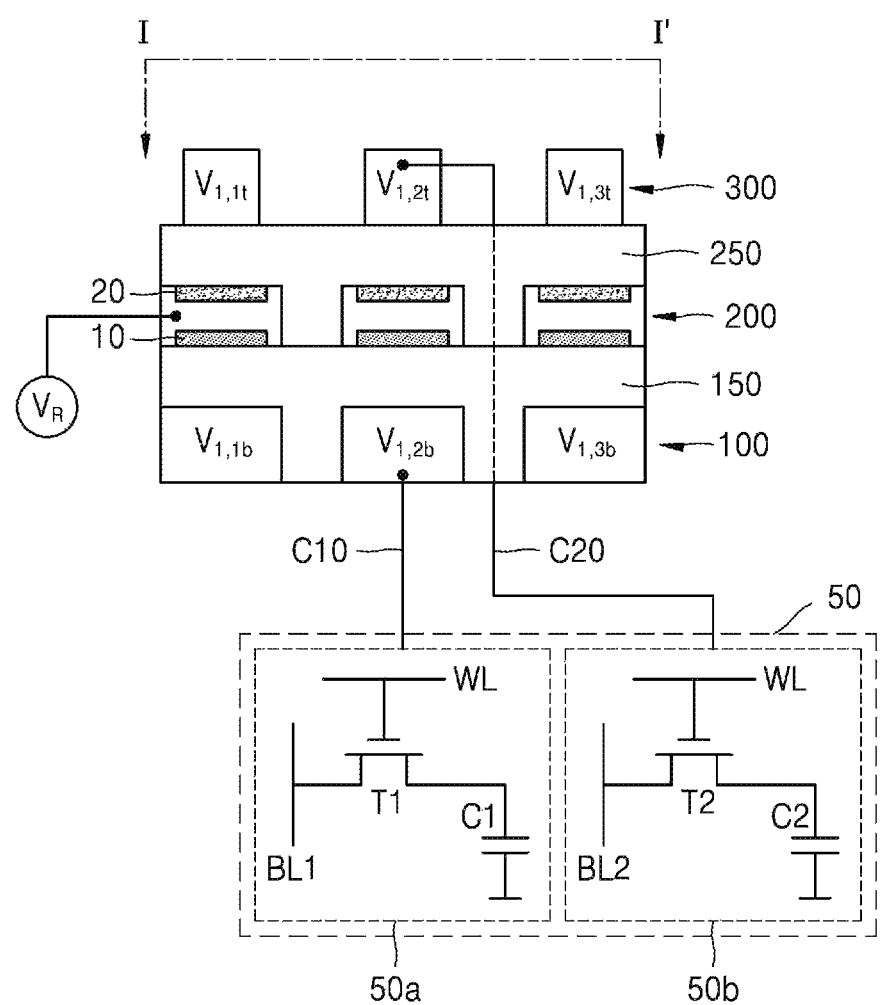
FIG. 1B is a cross-sectional view taken along line I-I' of FIG. 1A.
Figure 1C:
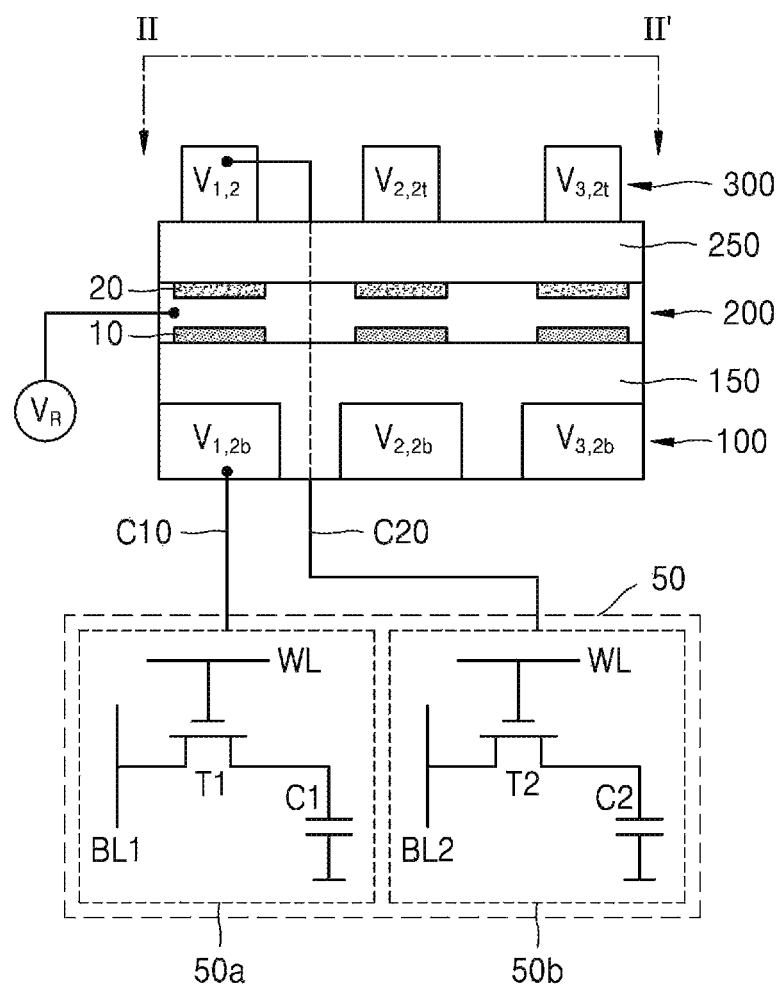
FIG. 1C is a cross-sectional view taken along line II-II' of FIG. 1A.

FIG. 1A is a perspective view of an optical modulation device according to an example embodiment. FIG. 1B is a cross-sectional view taken along line I-I' of FIG. 1A. FIG. 1C is a cross-sectional view taken along line II-II' of FIG. 1A.

Referring to FIGS. 1A through 1C, a plurality of reflectors 100 may be arranged in an array, and a plurality of nano-antennas 300 may be arranged in an array on the plurality of reflectors 100. An active layer 200 whose properties vary according to an electrical condition may be located between the plurality of reflectors 100 and the plurality of nano-antennas 300. The active layer 200 may be patterned to have a plurality of openings therein. A first insulating layer 150 may be located between the plurality of reflectors 100 and the active layer 200, and a second insulating layer 250 may be located between the active layer 200 and the plurality of nano-antennas 300.

The plurality of reflectors 100, the active layer 200, and the plurality of nano-antennas 300 may be located on a driving circuit substrate. FIGS. 1A through 1C illustrate a circuit configuration 50 of the driving circuit substrate. The circuit configuration 50 may be repeatedly formed, as described below in more detail. A plurality of first connection members C10 for electrically connecting the driving circuit substrate to the plurality of reflectors 100 may be provided. Although FIGS. 1A through 1C illustrate one first connection member C10, the plurality of first connection members C10 respectively connected to the plurality of reflectors 100 may be actually provided. Also, a plurality of second connection members C20 for electrically connecting the driving circuit substrate to the plurality of nano-antennas 300 may be provided. Although FIGS. 1A through 1C illustrate one second connection member C20, the plurality of second connection members C20 respectively connected to the plurality of nano-antennas 300 may be actually provided. The plurality of second connection members C20 may be connected to the plurality of nano-antennas 300 through the openings formed in the active layer 200. The second connection members C20 may be formed in via holes formed in the first and second insulating layers 150 and 250 to pass through the openings formed in the active layer 200. The second connection members C20 may have vertical interconnect access (VIA) structures. The second connection members C20 may be physically and electrically separated from the active layer 200.

The active layer 200 may include a plurality of active regions. A first reflector from among the plurality of reflectors 100 may be located under a first active region from among the plurality of active regions and a first nano-antenna from among the plurality of nano-antennas 300 may be located over the first active region. The first active region, the first reflector, and the first nano-antenna may constitute one unit device. A plurality of unit devices may be arranged. In one unit device, voltages may be independently applied to the first reflector and the first nano-antenna with respect to the first active region. Alternatively, in one unit device, voltages may be independently applied to each of the first active region, the first reflector, and the first nano-antenna. In one unit device, the first reflector and the first nano-antenna may be located, respectively, under and over the first active region, that is, a portion of the active layer 200, and voltages may be independently applied to the first reflector and the first nano-antenna to change characteristics of the first active region. In this regard, the first active region may include a first charge concentration varying region 10 and a second charge concentration varying region 20. The first charge concentration varying region 10 is a region in which a charge concentration is changed due to a voltage applied to the first reflector, and the second charge concentration varying region 20 is a region in which a charge concentration is changed due to a voltage applied to the first nano-antenna. The first charge concentration varying region 10 may be located adjacent to the first insulating layer 150, and the second charge concentration varying region 20 may be located adjacent to the second insulating layer 250. Voltages may be independently applied to each of the plurality of reflectors 100, and voltages may be independently applied to each of the plurality of nano-antennas 300. Phase modulation of light generated by each of the plurality of unit devices may be independently controlled. A direction of a beam emitted from each of the plurality of unit devices may be steered by appropriately controlling phase modulation of light generated by the plurality of unit devices. For example, when the phase modulation of light generated by the plurality of unit devices arranged in a first direction is controlled to be sequentially reduced by $\pi/2$ in the first direction, a direction of light reflected by the plurality of unit devices may be controlled (steered) in a specific direction, which may be referred to as beam steering using an optical phased array method. A steering direction of light may be adjusted in any of various ways by adjusting a phase shift rule of a phased array.

The driving circuit substrate may include a plurality of unit cell areas respectively corresponding to the plurality of unit devices. The circuit configuration 50 of the driving circuit substrate may correspond to one unit cell area. Accordingly, the circuit configuration 50 may be referred to as a 'unit cell area' 50. The unit cell area 50 may include one or more transistors and one or more capacitors. For example, the unit cell area 50 may have a 2 transistor (T)-2 capacitor (C) structure including two transistors (e.g., first and second transistors T1 and T2) and two capacitors (e.g., first and second capacitors C1 and C2). The unit cell area 50 may include a first sub-area 50a and a second sub-area 50b, and the first sub-area 50a may be connected to one of the plurality of reflectors 100 and the second sub-area 50b may be connected to one of the plurality of nano-antennas 300. The first sub-area 50a may have a 1T-1C structure including the first transistor T1 and the first capacitor C1, and the second sub-area 50b may have a 1T-1C structure including the second transistor T2 and the second capacitor C2. Although the unit cell area 50 has a 2T-2C structure and each of the first and second sub-areas 50a and 50b has a 1T-1C structure, the present example embodiment is not limited thereto.

The first sub-area 50a may include a word line WL and a bit line BL1 and may include the first transistor T1 connected between the word line WL and the bit line BL1, and the first capacitor C1 may be connected to the first transistor T1. Although not shown in FIGS. 1A through 1C, the first capacitor C1 may be connected to the reflector 100 of a unit device corresponding to the first capacitor C1. The bit line BL1 may be electrically connected to the reflector 100 of the corresponding unit device. Likewise, the second sub-area 50b may include a word line WL and a bit line BL2 and may include the second transistor T2 connected between the word line WL and the bit line BL2, and the second capacitor C2 may be connected to the second transistor T2. Although not shown in FIGS. 1A through 1C, the second capacitor C2 may be connected to the nano-antenna 300 of the unit device corresponding to the second capacitor C2. The bit line BL2 may be electrically connected to the nano-antenna 300 of the corresponding unit device. The word line WL of the first sub-area 50a and the word line WL of the second sub-area 50b may be one line. In this case, the unit cell area 50 may have a 1WL-2BL structure including one word line WL and two bit lines (i.e., the bit lines BL1 and BL2). However, this described configuration of the unit cell area 50 is merely an example, and the present example embodiment is not limited thereto.

In FIGS. 1A through 1C, $V_R$ connected to the active layer 200 denotes a reference voltage applied to the active layer 200. In one unit device, according to voltages respectively applied to the reflector 100 and the nano-antenna 300 based on the reference voltage $V_R$ applied to the active layer 200, characteristics of the first and second charge concentration varying regions 10 and 20 of the active layer 200 may be changed. The reference voltage $V_R$ may be a ground voltage or a predetermined constant voltage. When the active layer 200 is patterned into a plurality of separated portions, the reference voltage $V_R$ may be applied to each of the separated portions. In FIGS. 1B and 1C, $V_{1,1b}$, $V_{1,2b}$, $V_{1,3b}$, $V_{1,2b}$, $V_{2,2b}$, and $V_{3,2b}$ denote voltages applied to the plurality of reflectors 100, and $V_{1,1t}$, $V_{1,2t}$, $V_{1,3t}$, $V_{1,2t}$, $V_{2,2t}$, and $V_{3,2t}$ denote voltages applied to the plurality of nano-antennas 300. Although a structure with three rows and three columns is illustrated as an example in FIGS. 1A through 1C, the structure may be extended to a structure with m rows and n columns.

Figure 2:
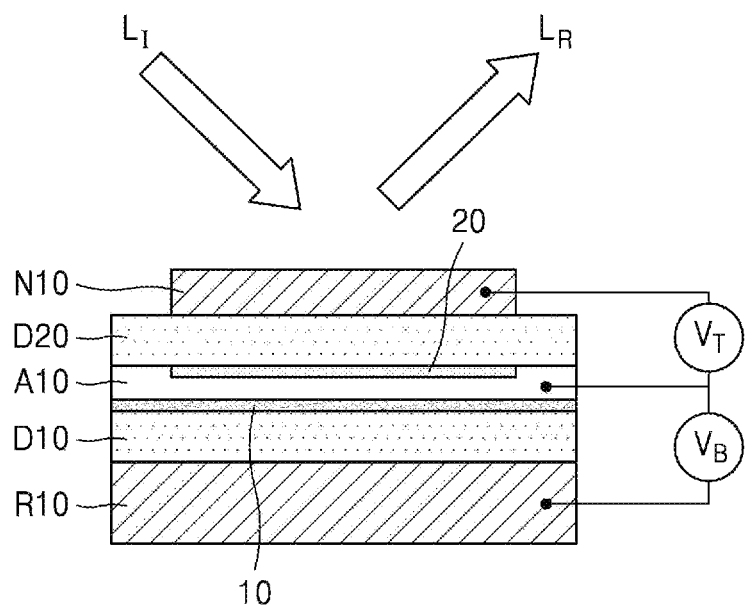
FIG. 2 is a cross-sectional view illustrating a configuration of a unit device of an optical modulation device according to an example embodiment.

FIG. 2 is a cross-sectional view illustrating a configuration of a unit device of an optical modulation device according to an example embodiment.

Referring to FIG. 2, the optical modulation device may include a reflector R10 and a nano-antenna N10 facing the reflector R10. The nano-antenna N10 may be a plasmonic nano-antenna. An active layer A10 may be located between the reflector R10 and the nano-antenna N10. The active layer A10 may be a layer whose physical properties vary according to an electrical condition. A permittivity of the active layer A10 may vary according to an electrical condition related to the active layer A10 and a region surrounding the active layer A10. A change in a permittivity of the active layer A10 may be caused by a change in charge concentrations (charge densities) of regions in the active layer A10. In other words, a permittivity of the active layer A10 may be changed due to a change in charge concentrations of regions in the active layer A10. A first insulating layer D10 may be located between the reflector R10 and the active layer A10. A second insulating layer D20 may be located between the active layer A10 and the nano-antenna N10. The first insulating layer D10 may be a first insulating layer for electrically insulating the reflector R10 from the active layer A10, and the second insulating layer D20 may be a second insulating layer for electrically insulating the active layer A10 from the nano-antenna N10.

The optical modulation device according to the present example embodiment may include a signal applying unit configured to independently apply electrical signals to at least two from among the nano-antenna N10, the active layer A10, and the reflector R10. The signal applying unit may be configured to independently apply voltages to each of the reflector R10 and the nano-antenna N10. For example, the signal applying unit may include a first voltage applying unit $V_B$ for applying a first voltage between the reflector R10 and the active layer A10, and a second voltage applying unit $V_T$ for applying a second voltage between the active layer A10 and the nano-antenna N10. In this case, a reference voltage may be applied to the active layer A10.

The active layer A10 may include a region, that is, the first charge concentration varying region 10, in which the charge concentration varies according to a voltage applied by the first voltage applying unit $V_B$ between the reflector R10 and the active layer A10. Also, the active layer A10 may include a region, that is, the second charge concentration varying region 20, in which the charge concentration varies according to a voltage applied by the second voltage applying unit $V_T$ between the active layer A10 and the nano-antenna N10. The first charge concentration varying region 10 may be located adjacent to the first insulating layer D10, and the second charge concentration varying region 20 may be located adjacent to the second insulating layer D20. The first charge concentration varying region 10 and the second charge concentration varying region 20 may be independently controlled.

The nano-antenna N10 may be an antenna having a nano-structure and configured to capture energy by converting light of a specific wavelength (or frequency) (including incident light and visible and invisible electromagnetic waves (e.g., ultraviolet rays or infrared ways)) into localized surface plasmon resonant light. The nano-antenna N10 may be a conductive layer pattern (e.g., a metal layer pattern), and the conductive layer pattern may contact a non-conductive layer (e.g., a dielectric layer). Plasmon resonance may occur at an interface between the conductive layer pattern and the non-conductive layer. In this case, the non-conductive layer (e.g., the dielectric layer) may be the second insulating layer D20, or a layer different from the second insulating layer D20. For convenience, the following will be described on the assumption that the conductive layer pattern is the nano-antenna N10. An interface at which surface plasmon resonance occurs, such as the interface between the conductive layer pattern and the non-conductive layer, may be referred to as a "meta surface" or a "meta structure".

The nano-antenna N10 may be formed of a conductive material and may have a sub-wavelength dimension. The term 'sub-wavelength dimension' refers to a dimension smaller than an operating wavelength of the nano-antenna N10. At least one dimension from among a thickness, a horizontal length, and a vertical length of the nano-antenna N10, and an interval between adjacent nano-antennas N10 may be a sub-wavelength dimension. A resonance wavelength may vary according to a shape and a dimension of the nano-antenna N10.

A conductive material used to form the nano-antenna N10 may be a metal material having high conductivity and capable of causing surface plasmon excitation. For example, the nano-antenna N10 may be formed of at least one metal selected from the group consisting of copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au), or an alloy including at least one of the metals. Alternatively, the nano-antenna N10 may include a thin film within which metal nano-particles such as Au or Ag are dispersed, a carbon nano-structure such as graphene or carbon nanotubes (CNTs), a conductive polymer such as poly(3,4-ethylenedioxythiophene) (PEDOT), polypyrrole (PPy), or poly(3-hexylthiophene) (P3HT), or a conductive oxide.

The active layer A10 may be a layer whose physical properties vary according to an electrical condition applied to the active layer A10 and may function as an electrode. For example, the active layer A10 may be a layer having a permittivity that varies according to an electrical condition. Charge concentrations (charge densities) of regions in the active layer A10 may be changed due to an electrical field applied to the active layer A10, and thus a permittivity of the active layer A10 may be changed. For example, the active layer A10 may include a transparent conductive oxide (TCO) such as indium tin oxide (ITO), indium zinc oxide (IZO), aluminum zinc oxide (AZO), gallium zinc oxide (GZO), aluminum gallium zinc oxide (AGZO), or gallium indium zinc oxide (GIZO). Alternatively, the active layer A10 may include a transition metal nitride (TMN) such as TiN, ZrN, HfN, or TaN. In addition, the active layer A10 may include an electro-optic (EO) material having an effective permittivity that is changed when an electrical signal is applied thereto. The EO material may include a crystalline material such as $LiNbO_3$, $LiTaO_3$, potassium tantalate niobate (KTN), or lead zirconate titanate (PZT), or any of various polymers having EO characteristics.

A permittivity of the active layer A10 may vary according to wavelength. A relative permittivity $\varepsilon_r$ to a permittivity $\varepsilon_0$ of vacuum may be defined as a dielectric constant, and a real part of the dielectric constant of the active layer A10 may be equal to 0 in a predetermined wavelength band. A wavelength band in which the real part of the dielectric constant is equal or approximately equal to 0 is referred to as an epsilon near zero (ENZ) wavelength band. A dielectric constant of most materials may be a function of a wavelength and may be indicated as a complex number. The dielectric constant of vacuum is 1, and the real part of the dielectric constant of a dielectric material is a positive number greater than 1. When a metal is used, the real part of the dielectric constant may be a negative number. The dielectric constant of most materials has a value greater than 1 in most wavelength bands, whereas the real part of the dielectric constant may be equal to 0 in a specific wavelength. It is known that when the real part of the dielectric constant is equal or approximately equal to 0, the dielectric material exhibits specific optical properties. The optical modulation device of the present example embodiment may set an operation wavelength band as an area including an ENZ wavelength band of the active layer A10. A range in which optical modulation performance is adjusted may be increased by setting a resonance wavelength band of the nano-antenna N10 to be similar to the ENZ wavelength band of the active layer A10. The ENZ wavelength band of the active layer A10 may vary according to characteristics (e.g., charge concentrations) of the first and second charge concentration varying regions 10 and 20.

The reflector R10 may include a conductive material and may function as an electrode. The conductive material of the reflector R10 may be the same as or similar to the conductive material of the nano-antenna N10. For example, the reflector R10 may include at least one metal selected from the group consisting of Cu, Al, Ni, Fe, Co, Zn, Ti, Ru, Rh, Pd, Pt, Ag, Os, Ir, and Au, or an alloy including at least one of these metals. Alternatively, the reflector R10 may include a thin film within which metal nano-particles such as Au or Ag are dispersed, a carbon nano-structure such as graphene or CNTs, a conductive polymer such as PEDOT, PPy, or P3HT, or a conductive oxide.

The reflector R10 may be a back reflector electrode located under the active layer A10. That is, the reflector R10 may reflect light and may function as an electrode. The reflector R10 may be optically coupled to the nano-antenna N10 corresponding to the reflector R10, and light may be reflected by an optical interaction between the nano-antenna N10 and the reflector R10.

Each of the first insulating layer D10 and the second insulating layer D20 may include an insulating material (e.g., a dielectric material). At least one of the first and second insulating layers D10 and D20 may include at least one of an insulating silicon compound and an insulating metal compound. Examples of the insulating silicon compound may include silicon oxide (SiOx), silicon nitride (SixNy), and silicon oxynitride (SiON), and examples of the insulating metal compound may include aluminum oxide ($Al_2O_3$), hafnium oxide (HfO), zirconium oxide (ZrO), and hafnium silicon oxide (HfSiO). However, the above detailed materials of the first and second insulating layers D10 and D20 are merely examples and the present example embodiment is not limited thereto. The first insulating layer D10 and the second insulating layer D20 may be formed of the same materials or different materials.

Voltages may be independently applied between the active layer A10 and the conductive layer C10 and between the active layer A10 and the nano-antenna N10 by using the first voltage applying unit $V_B$ and the second voltage applying unit $V_T$. When the active layer A10 is grounded, that is, when a voltage of the active layer A10 is 0 V, a voltage applied to the reflector R10 by the first voltage applying unit $V_B$ may be a positive (+) voltage or a negative (−) voltage. When a voltage applied to the reflector R10 is a positive (+) voltage, the first charge concentration varying region 10 may be a charge accumulation region, and when a voltage applied to the reflector R10 is a negative (−) voltage, the first charge concentration varying region 10 may be a charge depletion region. A voltage of 0 V may also be applied to the reflector R10. Also, a voltage applied to the nano-antenna N10 by the second voltage applying unit $V_T$ may be a positive (+) voltage or a negative (−) voltage. When a voltage applied to the nano-antenna N10 is a positive (+) voltage, the second charge concentration varying region 20 may be a charge accumulation region, and when a voltage applied to the nano-antenna N10 is a negative (−) voltage, the second charge concentration varying region 20 may be a charge depletion region. A voltage of 0 V may also be applied to the nano-antenna N10. Levels of voltages applied by the first voltage applying unit $V_B$ and the second voltage applying unit $V_T$ may be different from each other.

Since voltages applied to the reflector R10 and the nano-antenna N10 are independently adjusted, characteristics of the first and second charge concentration varying regions 10 and 20 may be independently controlled. Accordingly, any one of the first and second charge concentration varying regions 10 and 20 may be a charge accumulation region, and the other one may be a charge depletion region. Alternatively, both the first and second charge concentration varying region 10 and 20 may be charge accumulation regions or charge depletion regions. Even when both the first and second charge concentration varying regions 10 and 20 are charge accumulation regions or charge depletion regions, charge concentrations of the first and second charge concentration varying regions 10 and 20 may be differently controlled.

Assuming that majority carriers of the active layer A10 are negative (−) charges, in other words, that the active layer A10 is an N-type electrode or an N-doped material layer, when a voltage applied to the reflector R10 is a positive (+) voltage, the first charge concentration varying region 10 may be an electron accumulation region, and when a voltage applied to the reflector R10 is a negative (−) voltage, the first charge concentration varying region 10 may be an electron depletion region. Likewise, when a voltage applied to the nano-antenna N10 is a positive (+) voltage, the second charge concentration varying region 20 may be an electron accumulation region, and when a voltage applied to the nano-antenna N10 is a negative (−) voltage, the second charge concentration varying region 20 may be an electron depletion region. Majority carriers of the active layer A10 may be positive charges. In other words, the active layer A10 may be a P-type electrode or a P-doped material layer. In this case, when a voltage applied to the reflector R10 is a positive (+) voltage, the first charge concentration varying region 10 may be a hole depletion region, and when a voltage applied to the reflector R10 is a negative (−) voltage, the first charge concentration varying region 10 may be a hole accumulation region. Likewise, when a voltage applied to the nano-antenna N10 is a positive (+) voltage, the second charge concentration varying region 20 is a hole depletion region, and when a voltage applied to the nano-antenna N10 is a negative (−) voltage, the second charge concentration varying region 20 may be a hole accumulation region.

The reflector R10 may be referred to as a first gate electrode, and the nano-antenna N10 may be referred to as a second gate electrode. The first insulating layer D10 may be referred to as a first gate insulating layer, and the second insulating layer D20 may be referred to as a second gate insulating layer. A voltage applied to the reflector R10 may be referred to as a first gate voltage, and a voltage applied to the nano-antenna N10 may be referred to as a second gate voltage. The first and second gate voltages may be independently controlled. In this regard, the optical modulation device of the present example embodiment has a double electrode structure (e.g., a double gate electrode structure).

Characteristics of the first and second charge concentration varying regions 10 and 20 may be independently controlled by using the first voltage applying unit $V_B$ and the second voltage applying unit $V_T$, and optical modulation characteristics of the optical modulation device may be changed correspondingly. Optical modulation characteristics may be controlled by a change in characteristics of the active layer A10 and an EO interaction among the nano-antenna N10, the active layer A10, and the reflector R10. For example, when predetermined incident light $L_I$ is reflected by the nano-antenna N10, characteristics of reflected light $L_R$ may vary according to characteristics of the first and second charge concentration varying regions 10 and 20. In other words, characteristics of the reflected light $L_R$ may vary according to a voltage applied to the reflector R10 by the first voltage applying unit $V_B$ and a voltage applied to the nano-antenna N10 by the second voltage applying unit $V_T$. Since characteristics of the first and second charge concentration varying regions 10 and 20 are independently controlled, optical modulation characteristics may be significantly improved and noise or the like may be reduced, as described below in more detail with reference to FIGS. 7 and 8.

Figure 3:
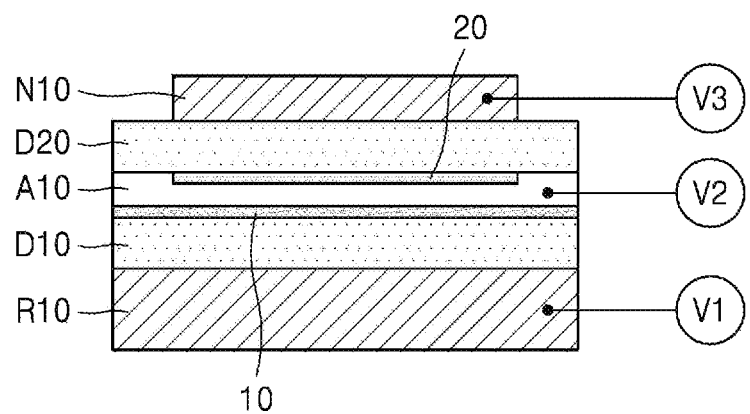
FIG. 3 is a cross-sectional view illustrating a configuration of a unit device of an optical modulation device according to another example embodiment.

Although the "signal applying unit" for applying an electrical signal to the optical modulation device includes the first voltage applying unit $V_B$ connected between the reflector R10 and the active layer A10 and the second voltage applying unit $V_T$ connected between the active layer A10 and the nano-antenna N10, and the active layer A10 is grounded in FIG. 2, a configuration of the signal applying unit may be modified, as exemplarily shown in FIG. 3.

FIG. 3 is a cross-sectional view illustrating a configuration of a unit device of an optical modulation device according to another example embodiment.

Referring to FIG. 3, a signal applying unit for applying an electrical signal to the optical modulation device may be configured to independently apply voltages to the reflector R10, the active layer A10, and the nano-antenna N10. The signal applying unit may include a first voltage applying unit V1 for applying a first voltage to the reflector R10, a second voltage applying unit V2 for applying a second voltage to the active layer A10, and a third voltage applying unit V3 for applying a third voltage to the nano-antenna N10. The first voltage may be greater or less than the second voltage. Also, the third voltage may be greater or less than the second voltage. If necessary, at least one of the first voltage and the third voltage may be the same as the second voltage. The second voltage may be a reference voltage for the first and third voltages. The second voltage may be, optionally, a ground voltage. Since voltages are independently applied to each of the reflector R10, the active layer A10, and the nano-antenna N10, characteristics of the first and second charge concentration varying regions 10 and 20 may be independently controlled by potential differences among the reflector R10, the active layer A10, and the nano-antenna N10.

Figure 4:
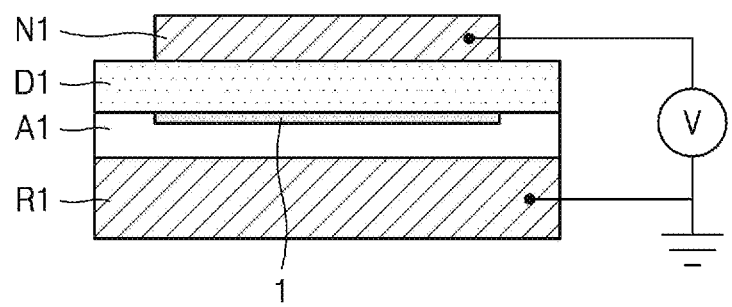
FIG. 4 is a cross-sectional view of a unit device of an optical modulation device according to a comparative example.

FIG. 4 is a cross-sectional view of a unit device of an optical modulation device according to a comparative example.

Referring to FIG. 4, the optical modulation device according to the comparative example may include a nano-antenna N1 located over a reflector R1, an active layer A1 contacting the reflector R1, and an insulating layer D1 located between the active layer A1 and the nano-antenna N1. Also, the optical modulation device according to the comparative example includes a voltage applying unit V for applying a voltage to the nano-antenna N1 with respect to the reflector R1. The voltage applying unit V is connected between the reflector R1 and the nano-antenna N1, and the reflector R1 is grounded.

In this case, one charge concentration varying region 1 may be formed in the active layer A1 according to a voltage applied by the voltage applying unit V between the reflector R1 and the nano-antenna N1. The charge concentration varying region 1 may be formed adjacent to the insulating layer D1. The optical modulation device may have a single gate electrode structure.

Figure 5:
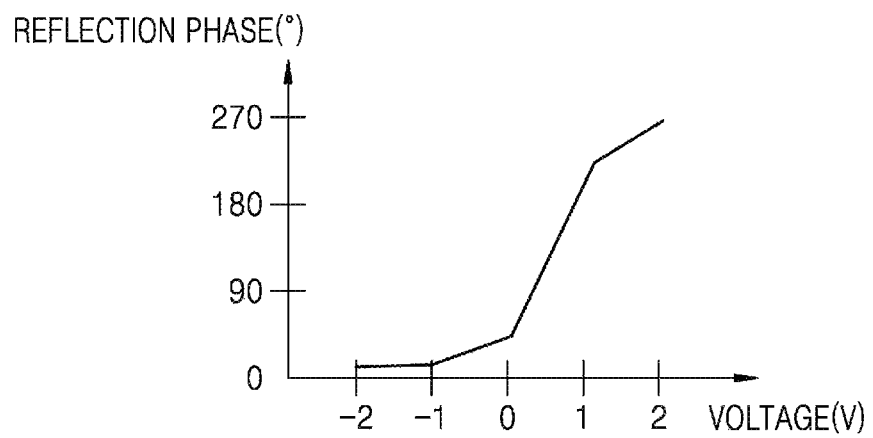
FIG. 5 is a graph showing a change in a phase (i.e., a change in a reflection phase) of reflected light according to a voltage application condition of the optical modulation device according to the comparative example of FIG. 4.

FIG. 5 is a graph showing a change in a phase (i.e., a change in a reflection phase) of reflected light according to a voltage application condition of the optical modulation device according to the comparative example of FIG. 4.

Referring to FIG. 5, a reflection phase (°) is changed according to a voltage. The reflection phase (°) is changed by up to about 270° and is difficult to be changed by more than about 270°. Accordingly, there is a limitation that all phases may not be represented. Due to the limitation, noise may be increased during light wave steering (i.e., beam steering).

Figure 6:
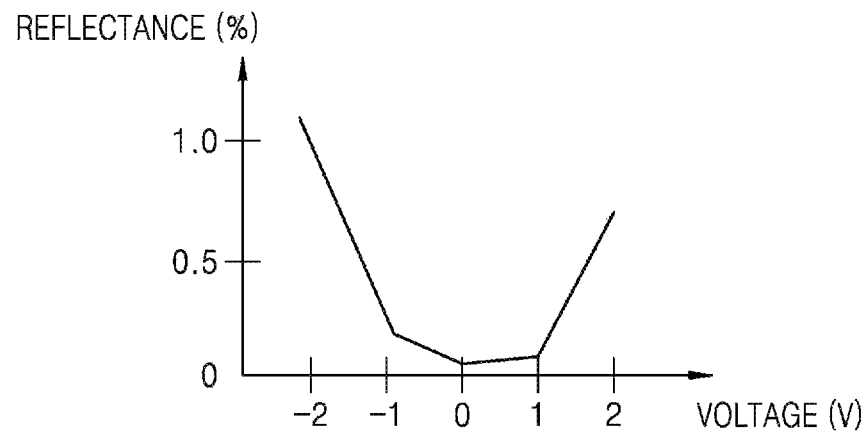
FIG. 6 is a graph showing a change in a reflectance according to a voltage application condition of the optical modulation device according to the comparative example of FIG. 4.

FIG. 6 is a graph showing a change in a reflectance according to a voltage application condition of the optical modulation device according to the comparative example of FIG. 4.

Referring to FIG. 6, it is found that a reflectance (%) is greatly changed according to a voltage. Since the reflectance (%) is different for each voltage, distortion occurs at a wavefront of a generated light wave. As a result, noise is increased when the light wave is steered. Once noise is increased, energy of a main lobe may be reduced, a monitoring distance may be reduced, and light reflected by a beam steered to an undesired direction may cause information distortion. An intensity of main light may be reduced, an intensity of noise light may be increased, and a signal-to-noise ratio (SNR) may be reduced, thereby degrading scanning performance.

Figure 7:
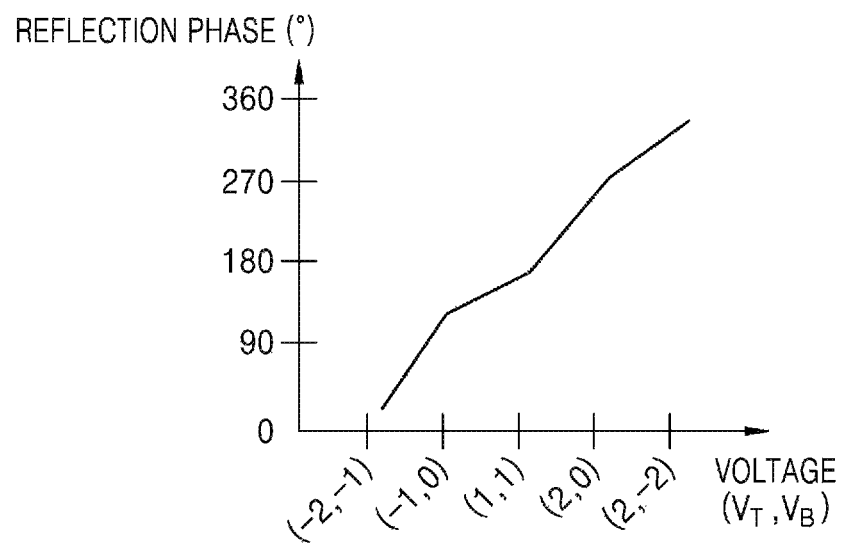
FIG. 7 is a graph showing a change in a phase (i.e., a change in a reflection phase) of reflective light according to a voltage application condition of the optical modulation device of FIG. 2.

FIG. 7 is a graph showing a change in a phase (i.e., a change in a reflection phase) of reflected light according to a voltage application condition of the optical modulation device of FIG. 2.

Referring to FIG. 7, since voltages may be independently applied to each of the nano-antenna N10 that is located over the reflector R10 and the reflector R10 that is located under the nano-antenna N10, the horizontal axis represents a combination of an upper voltage $V_T$ and a lower voltage $V_B$. According to the present example embodiment, a reflection phase (°) may be changed by up to 360° according to a voltage condition, unlike in the comparative example of FIG. 5 where a reflection phase (°) is changed by up to 270°.

Figure 8:
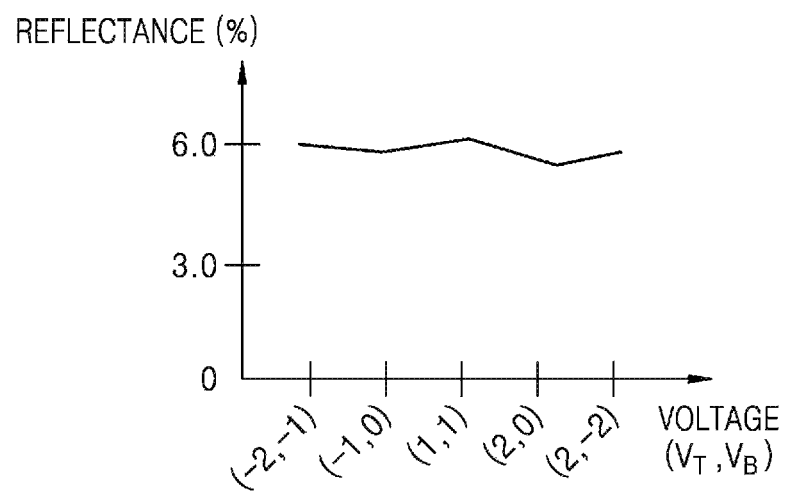
FIG. 8 is a graph showing a change in a reflectance according to a voltage application condition of the optical modulation device of FIG. 2.

FIG. 8 is a graph showing a change in a reflectance according to a voltage application condition of the optical modulation device of FIG. 2.

Referring to FIG. 8, a reflectance (%) may be maintained at a near constant level while a reflection phase (°) is changed according to a voltage condition. For example, within a measurement range, the amount of change in the reflectance (%) may be about ±15% or less, unlike in the comparative example of FIG. 6 where a reflectance (%) is greatly changed. Also, it is found that an average reflectance (%) of FIG. 8 is much higher than a maximum reflectance (%) of FIG. 6.

As shown in FIGS. 7 and 8, according to the present example embodiment, since the reflection phase (°) may be changed by up to 360° and the reflectance (%) may be maintained at a near constant level, efficiency during light wave steering may be improved, noise may be reduced, and distortion may be suppressed. A main light component of a reflected steered light wave may be increased, a noise light component may be reduced, and an SNR may be increased. The optical modulation device according to an example embodiment may easily perform optical modulation using a constant amplitude method, a 2π(360°)-full coverage method, and a phase-only modulation method.

An active layer (e.g., the active layer 200 of FIG. 1A) in an example embodiment may be patterned into any of various shapes having a plurality of openings. The active layer may be patterned to have any of various grid or grating structures. Specifically, the active layer may be patterned into a line pattern including a plurality of line layers, and in this case, the plurality of openings may be formed between the plurality of line layers. Alternatively, the active layer may be patterned into a mesh pattern, and the plurality of openings may be defined by the mesh pattern. Also, the active layer may be patterned into any of various other patterns.

Figure 9A:
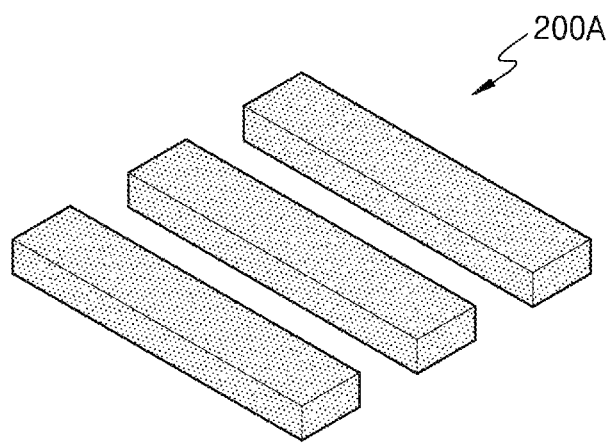
FIGS. 9A and 9B are respectively a perspective view and a top plan view illustrating an active layer pattern applicable to an optical modulation device according to an example embodiment.
Figure 9B:
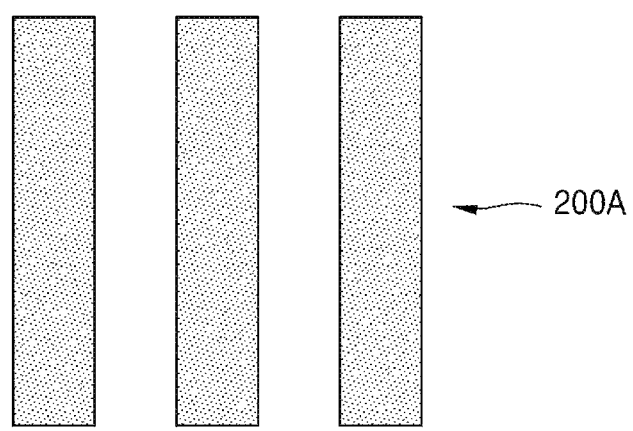

FIGS. 9A and 9B are respectively a perspective view and a top plan view illustrating an active layer pattern applicable to an optical modulation device according to an example embodiment. Referring to FIGS. 9A and 9B, an active layer 200A may be patterned into a line pattern including a plurality of line layers, and a plurality of openings may be formed between the plurality of line layers.

Figure 10A:
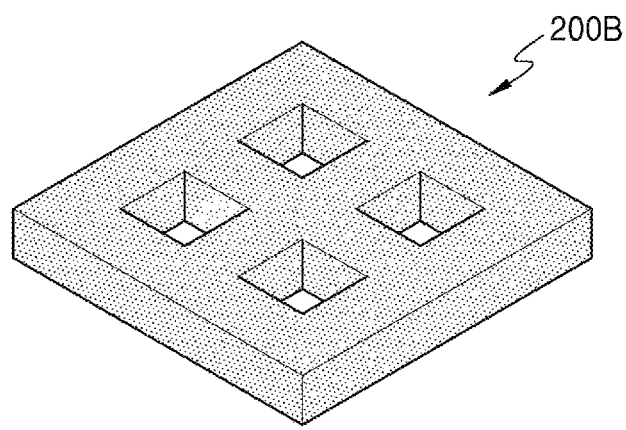
FIGS. 10A and 10B are respectively a perspective view and a top plan view illustrating an active layer pattern applicable to an optical modulation device according to another example embodiment.
Figure 10B:
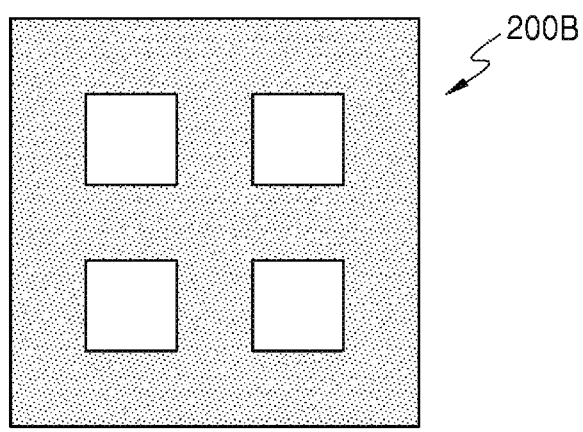

FIGS. 10A and 10B are respectively a perspective view and a top plan view illustrating an active layer pattern applicable to an optical modulation device according to another example embodiment. Referring to FIGS. 10A and 10B an active layer 200B may be patterned into a mesh pattern, and a plurality of openings may be defined by the mesh pattern. When the active layer 200B having the mesh pattern is used, regions of the active layer 200B may be electrically more closely connected, resistance may be reduced, a resistor-capacitor (RC) constant may be reduced, and an operating speed may be improved. Although the openings defined by the mesh pattern have quadrangular shapes in FIGS. 10A and 10B shapes of the openings may be any of various other shapes. For example, the openings may have any of various shapes such as polygonal shapes (e.g., triangular shapes, pentagonal shapes, or hexagonal shapes), circular shapes, or star shapes. In addition, patterns of the active layers 200A and 200B of FIGS. 9A through 10B may be modified in any of various ways.

Figure 11:
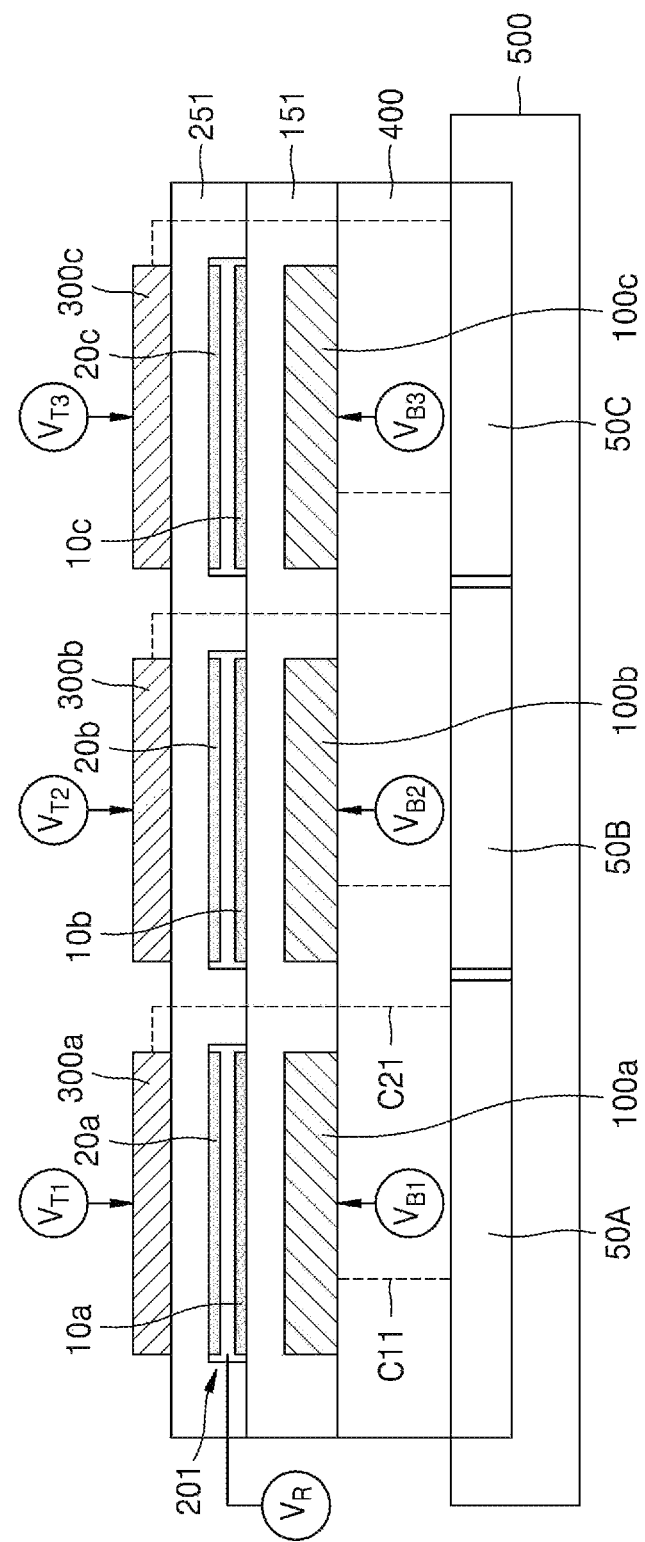
FIG. 11 is a cross-sectional view of an optical modulation device according to another example embodiment.

FIG. 11 is a cross-sectional view of an optical modulation device according to another example embodiment.

Referring to FIG. 11, a driving circuit substrate 500 may be provided, and a device structure as described with reference to FIG. 1 may be located on the driving circuit substrate 500. The device structure may include a plurality of reflectors 100a, 100b, and 100c, an active layer 201 that is patterned, and a plurality of nano-antennas 300a, 300b, and 300c, and may further include a first insulating layer 151 and a second insulating layer 251. Also, an interlayer insulating layer 400 may be further located between the driving circuit substrate 500 and the plurality of reflectors 100a, 100b, and 100c.

The driving circuit substrate 500 may include a plurality of unit cell areas 50A, 50B, and 50C, and each of the unit cell areas 50A, 50B, and 50C may include a first sub-area and a second sub-area. The first sub-area may be connected to one of the plurality of reflectors 100a, 100b, and 100c, and the second sub-area may be connected to one of the plurality of nano-antennas 300a, 300b, and 300c. A plurality of first connection members C11 for electrically connecting the driving circuit substrate 500 to the plurality of reflectors 100a, 100b, and 100c may be provided, and a plurality of second connection members C21 for electrically connecting the driving circuit substrate 500 to the plurality of nano-antennas 300a, 300b, and 300c may be provided. The plurality of second connection members C21 may be connected to the plurality of nano-antennas 300a, 300b, and 300c through openings formed in the active layer 201.

Voltages $V_{B1}$, $V_{B2}$, and $V_{B3}$ may be independently applied to the plurality of reflectors 100a, 100b, and 100c, and voltages $V_{T1}$, $V_{T2}$, and $V_{T3}$ may be independently applied to the plurality of nano-antennas 300a, 300b, and 300c. A plurality of first charge concentration varying regions 10a, 10b, and 10c may be formed in a first layer portion (i.e., a lower layer portion) of the active layer 201 due to the voltages $V_{B1}$, $V_{B2}$, and $V_{B3}$ independently applied to the plurality of reflectors 100a, 100b, and 100c. A plurality of second charge concentration varying regions 20a, 20b, and 20c may be formed in a second layer portion (i.e., an upper layer portion) of the active layer 201 due to the voltages $V_{T1}$, $V_{T2}$, and $V_{T3}$ independently applied to the plurality of nano-antennas 300a, 300b, and 300c. Charge concentrations of the plurality of first charge concentration varying regions 10a, 10b, and 10c and the plurality of second charge concentration varying regions 20a, 20b, and 20c may be independently controlled.

Figure 12:
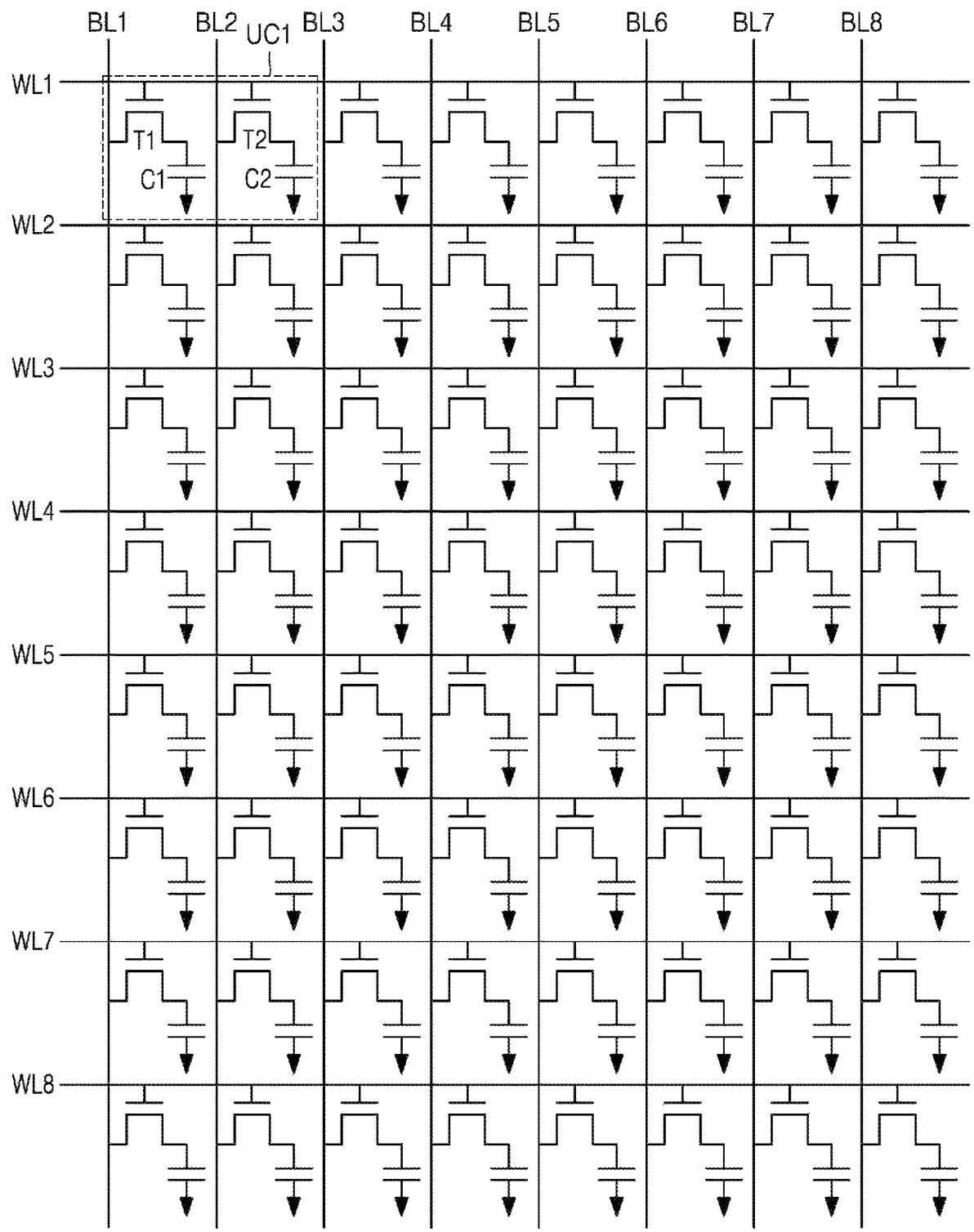
FIG. 12 is a circuit diagram illustrating a circuit configuration of a driving circuit substrate applicable to an optical modulation device according to an example embodiment.

FIG. 12 is a circuit diagram illustrating a circuit configuration of a driving circuit substrate applicable to an optical modulation device according to an example embodiment.

Referring to FIG. 12, a plurality of word lines (e.g., first through eighth word lines WL1 through WL8) may be arranged, and a plurality of bit lines (e.g., first through eighth bit lines BL1 through BL8) intersecting the plurality of word lines may be arranged. A plurality of unit cell areas UC1 may be regularly arranged in a matrix formed by the first through eighth word lines WL1 through WL8 and the first through eighth bit lines BL1 through BL8. Each of the unit cell areas UC1 may have a 1WL-2BL structure including one word line (e.g., the first word line WL1) and two bit lines (e.g., the first and second bit lines BL1 and BL2). The first transistor T1 and the first capacitor C1 may be connected between the first word line WL1 and the first bit line BL1, and the second transistor T2 and the second capacitor C2 may be connected between the first word line WL1 and the second bit line BL2. The circuit configuration of FIG. 12 may be referred to as an active matrix. The circuit configuration of FIG. 12 is merely an example and may be modified in any of various ways.

Figure 13:
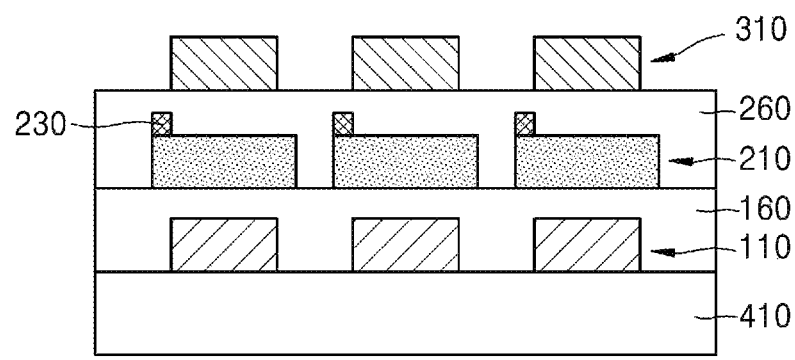
FIG. 13 is a cross-sectional view of an optical modulation device according to another example embodiment.
Figure 14:
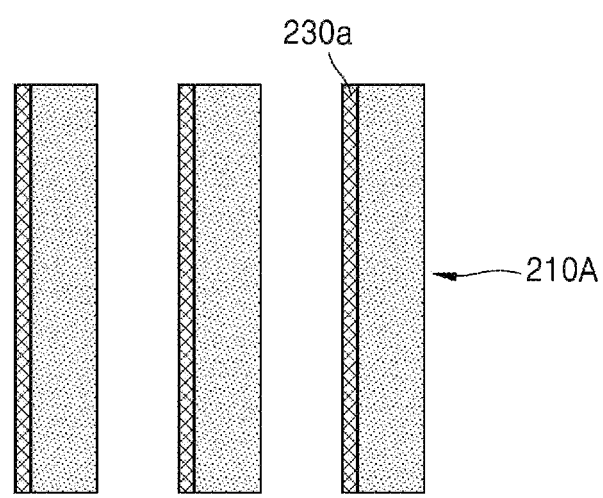
FIGS. 14 through 17 are plan views illustrating various shapes of an active layer and a wiring structure applicable to an optical modulation device according to an example embodiment.
Figure 15:
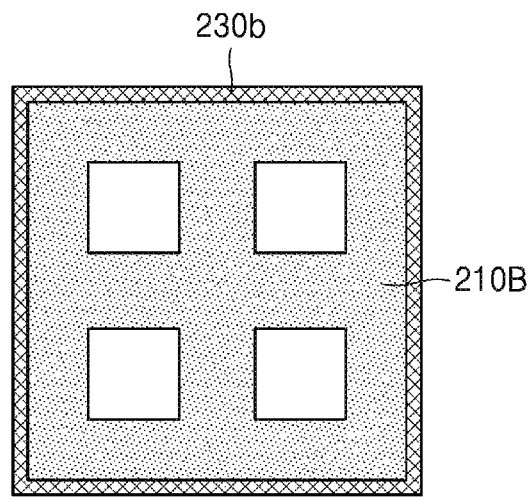

FIG. 13 is a cross-sectional view of an optical modulation device according to another example embodiment.

Referring to FIG. 13, the optical modulation device may include a plurality of reflectors 110, a plurality of nano-antennas 310, and an active layer 210 located between the plurality of reflectors 110 and the plurality of nano-antennas 310 and patterned into a predetermined shape. Also, the optical modulation device may further include a first insulating layer 160 located between the reflector 110 and the active layer 210, and a second insulating layer 260 located between the active layer 210 and the nano-antenna 310. Also, the optical modulation device may further include a wiring structure 230 located between the active layer 210 and the first insulating layer 160 and/or between the active layer 210 and the second insulating layer 260 to electrically contact the active layer 210. FIG. 13 illustrates an example in which the wiring structure 230 is located between the active layer 210 and the second insulating layer 260. The wiring structure 230 may have an electrical conductivity that is higher than that of the active layer 210. Although an electrical conductivity of the wiring structure 230 may be about 1.5 times to 2 times or more higher than an electrical conductivity of the active layer 210, this is merely an example and the present example embodiment is not limited thereto. Although the wiring structure 230 may be formed of a metal such as Au, Ag, or Cu, this is merely an example and the present example embodiment is not limited thereto. The wiring structure 230 may be formed of any of various metals or alloys.

An electrical signal (e.g., a voltage signal) to be applied to the active layer 210 may be uniformly distributed over the active layer 210 at a high speed through the wiring structure 230. In other words, a reference voltage may be applied at a high speed to the entire active layer 210 through the wiring structure 230. Accordingly, when the wiring structure 230 is used, an RC constant may be reduced and an operating speed (e.g., a response speed) may be improved.

FIGS. 14 through 17 are plan views illustrating various shapes of an active layer and a wiring structure applicable to an optical modulation device according to an example embodiment.

Figure 16:
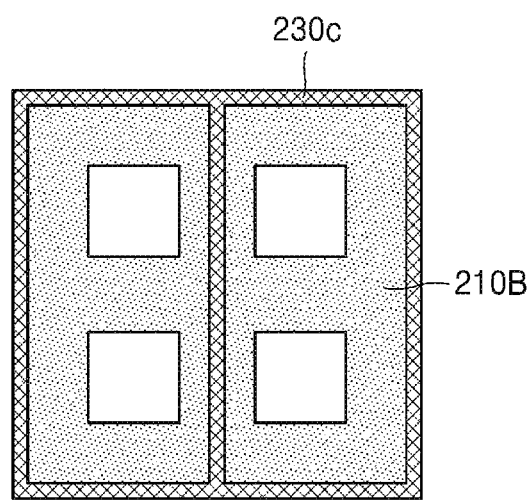
Figure 17:
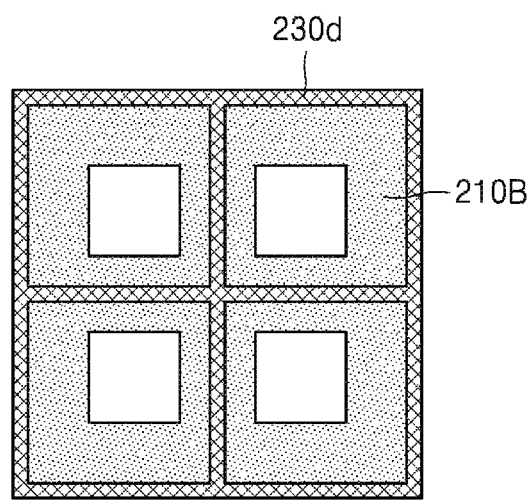

Referring to FIGS. 14 through 17, active layers 210A and 210B may respectively have a line pattern and a mesh pattern, and wiring structures 230a, 230b, 230c, and 230d may be used in any of various manners according to shapes of the active layers 210A and 210B. When the wiring structures 230c and 230d have a structure surrounding an edge portion and extending to an inner portion of the active layer 2108 as shown in FIGS. 16 and 17, an operating speed may be further improved.

For high-efficiency phase modulation, an active layer may be thin. As a thickness ratio of charge concentration varying regions to the active layer increases, a rate of change in characteristics of the active layer may increase. Accordingly, when the active layer is thin so that a thickness of the active layer is about a thickness of the charge concentration varying regions, a rate of change in characteristics may be improved. In this regard, the active layer may have a thickness equal to or less than about 10 nm or equal to or less than about 5 nm. However, the present example embodiment is not limited thereto, and a thickness of the active layer may be equal to or greater than 10 nm.

When the active layer is thin, electrical resistance of the active layer itself may increase. Such an increase in resistance may be compensated for and overcome by using additional wiring structures 230, and 230*a* through 230*d* of FIGS. 13 through 17, thereby improving an operating speed and a scan rate.

Figure 18:
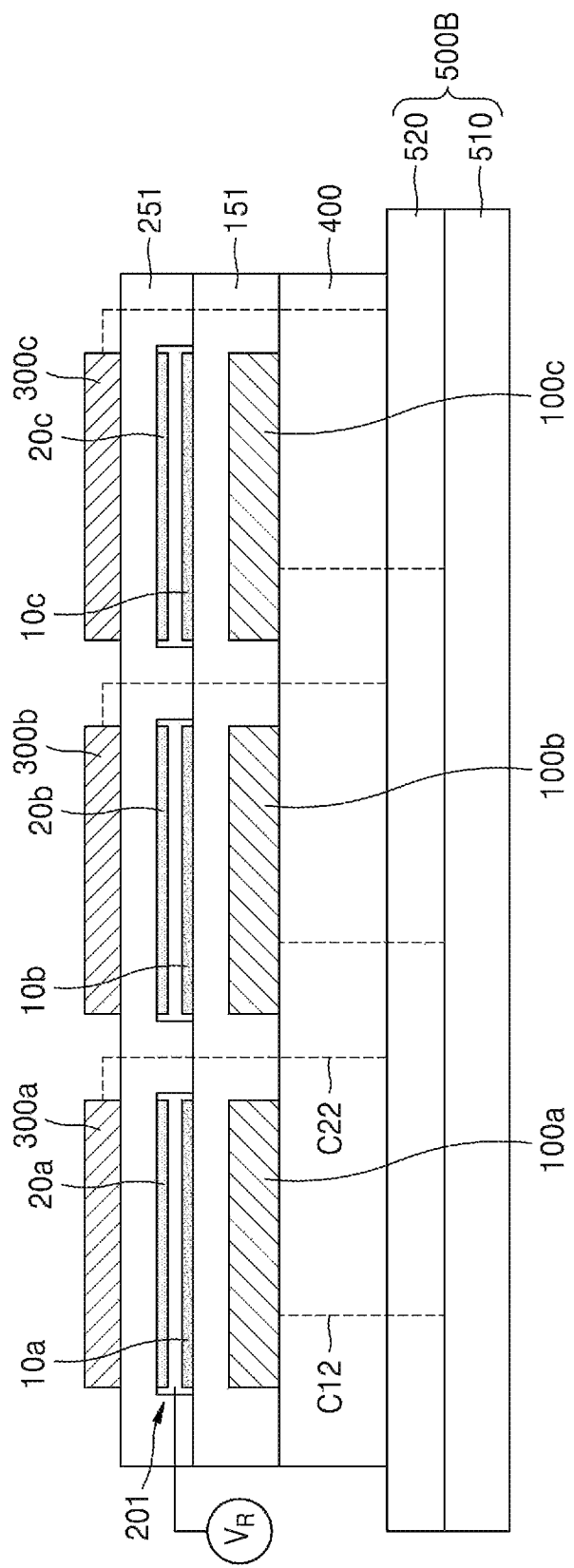
FIG. 18 is a cross-sectional view of an optical modulation device according to another example embodiment.

Although first sub-areas and second sub-areas of the driving circuit substrate 500 are formed at the same level in FIG. 11, the first sub-areas and the second sub-areas may be formed at different levels according to another example embodiment, as shown in FIG. 18.

FIG. 18 is a cross-sectional view of an optical modulation device according to another example embodiment.

Referring to FIG. 18, a driving circuit substrate 500B may include a first substrate 510 and a second substrate 520 located on the first substrate 510. First sub-areas of a driving circuit may be formed on the first substrate 510, and the first sub-areas may be connected to the plurality of reflectors 100*a*, 100*b*, and 100*c* through a plurality of first connection members C12. Second sub-areas of the driving circuit may be formed on the second substrate 520, and the second sub-areas may be connected to the plurality of nano-antennas 300*a*, 300*b*, and 300*c* through a plurality of second connection members C22. As such, when the first sub-areas and the second sub-areas are formed at different levels, a process margin may be improved and a degree of integration may be improved.

According to another example embodiment, a plurality of active layers may be located between a reflector array and a nano-antenna array. The plurality of active layers may be sequentially stacked between the reflector array and the nano-antenna array, and an insulating layer may be located between the plurality of active layers. Optical modulation characteristics may be improved and controlled by using a change in characteristics of the plurality of active layers.

According to another example embodiment, two or more nano-antennas may be located on one reflector. In this case, one reflector, two or more nano-antennas corresponding to the one reflector, and an active layer portion between the reflector and the nano-antennas may constitute one unit region.

Incident light may be vertically incident or obliquely incident at a predetermined angle onto the optical modulation device according to example embodiments. When light is obliquely incident, incident light and steered light may be spatially separated from each other.

FIGS. 19A-19D are perspective views illustrating various structures/shapes of a nano-antenna applicable to an optical modulation device according to example embodiments.

Figure 19A:
FIG. 19A-19D are perspective views illustrating various structures/shapes of a nano-antenna applicable to an optical modulation device according to embodiments.
Figure 19B:
Figure 19C:
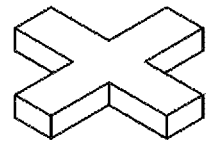
Figure 19D:
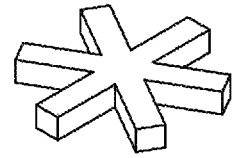

Referring to FIGS. 19A-19D, a nano-antenna may have any of various structures/shapes such as a circular disk type (FIG. 19A), an elliptical disk type (FIG. 19B), a cross type (FIG. 19C), or an asterisk type (FIG. 19D). The cross type (FIG. 19C) may be a type in which two nano-rods perpendicularly intersect each other, and the asterisk type (FIG. 19D) may be an asterisk (*) type in which three nano-rods cross one another. In addition, although not shown in FIGS. 19A-19D, the nano-antenna may have any of various other modified structures such as a cone type, a triangular pyramid type, a spherical type, a hemispherical type, a rice grain type, a rod type, or a fish-bone type. Also, the nano-antenna may have a multi-layer structure in which a plurality of layers are stacked and may have a core-shell structure including a core portion and at least one shell portion. In addition, nano-antennas having two or more different structures/shapes may constitute one unit and may be periodically arranged.

A resonance wavelength, a resonance wavelength width, resonance polarization characteristics, a resonance angle, and reflection/absorption/transmission characteristics may be changed according to a structure/type and an arrangement of nano-antennas. Accordingly, an optical modulation device having desired characteristics may be manufactured by controlling a structure/type and an arrangement of nano-antennas.

A device for steering a beam in a predetermined direction may be realized by using the optical modulation device according to any of the above example embodiments.

Figure 20:
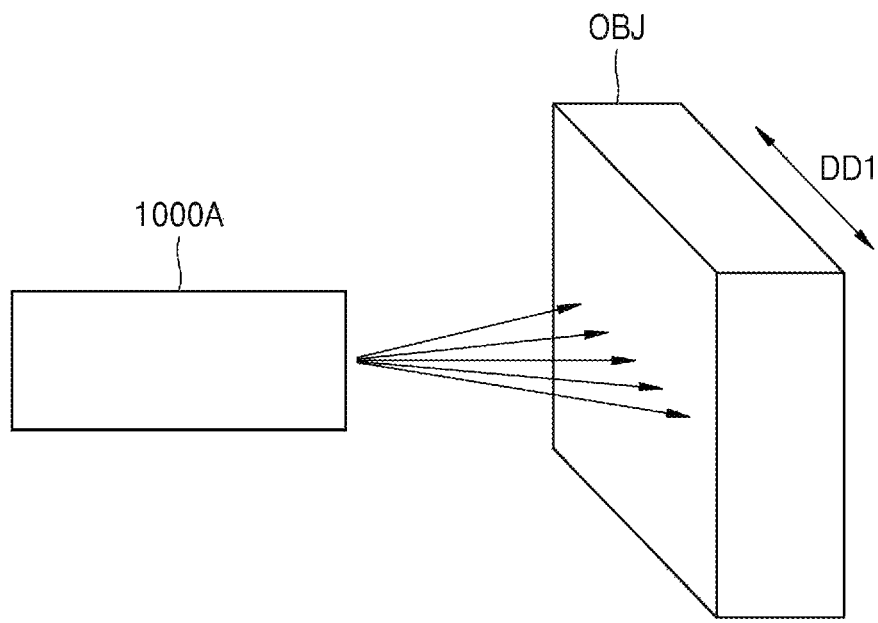
FIG. 20 is a conceptual view for describing a beam steering device including an optical modulation device according to an example embodiment.

FIG. 20 is a conceptual view for describing a beam steering device 1000A including an optical modulation device according to an example embodiment.

Referring to FIG. 20, a beam may be steered in a one-dimensional (1D) direction by using the beam steering device 1000A. That is, a beam may be steered toward a predetermined object OBJ in a first direction DD1. The beam steering device 1000A may include a 1D array of optical modulation devices according to example embodiments.

Figure 21:
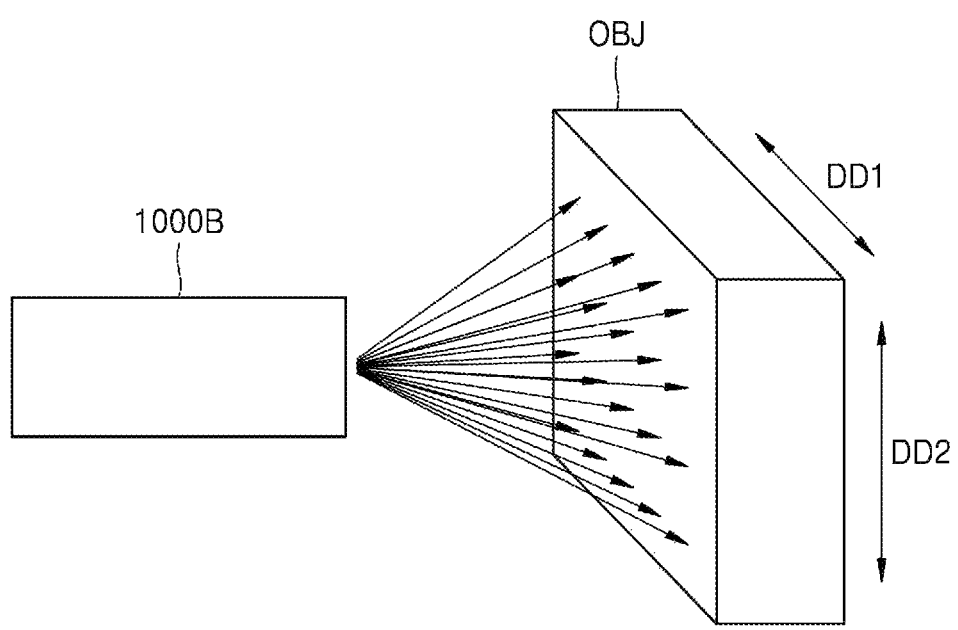
FIG. 21 is a conceptual view for describing a beam steering device including an optical modulation device according to another example embodiment.

FIG. 21 is a conceptual view for describing a beam steering device 1000B including an optical modulation device according to another example embodiment.

Referring to FIG. 21, a beam may be steered in a two-dimensional (2D) direction by using the beam steering device 1000B. That is, a beam may be steered toward the predetermined object OBJ in the first direction DD1 and a second direction DD2 that is perpendicular to the first direction DD1. The beam steering device 1000B may include a 2D array of optical modulation devices according to embodiments. The beam steering devices 1000A and 1000B of FIGS. 20 and 21 may be non-mechanical beam scanning apparatuses.

Figure 22:
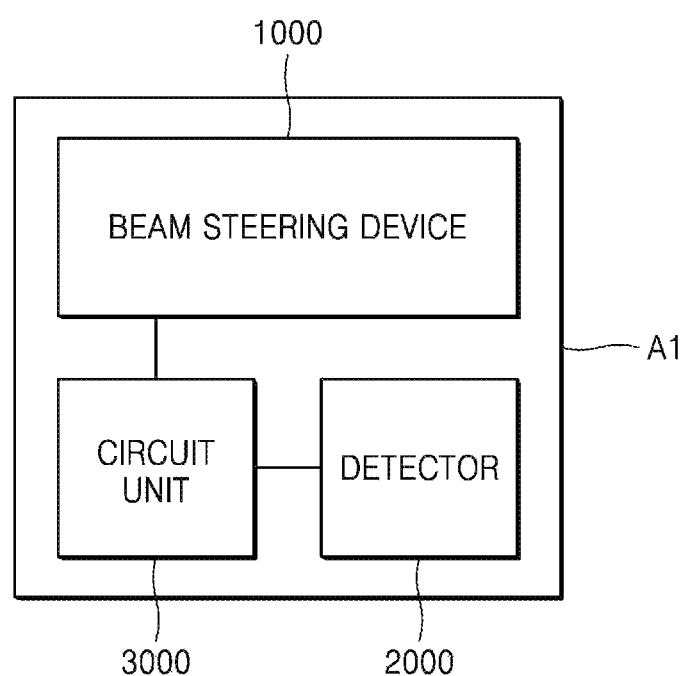
FIG. 22 is a block diagram for describing an overall system of an optical apparatus including a beam steering device using an optical modulation device according to an example embodiment.

FIG. 22 is a block diagram for describing an overall system of an optical apparatus A1 including a beam steering device 1000 using an optical modulation device according to an example embodiment.

Referring to FIG. 22, the optical apparatus A1 may include the beam steering device 1000. The beam steering device 1000 may include the optical modulation device of any of FIGS. 1 through 3 and FIGS. 9 through 19D. The optical apparatus A1 may include a light source unit in the beam steering device 1000, or may include a light source unit separate from the beam steering device 1000. The optical apparatus A1 may include a detector 2000 for detecting light steered by the beam steering device 1000 and reflected by an object (not shown). The detector 2000 may include a plurality of light detection elements and may further include other optical members. Also, the optical apparatus A1 may further include a circuit unit 3000 connected to at least one of the beam steering device 1000 and the detector 2000. The circuit unit 3000 may include a calculator for obtaining and calculating data and may further include a driver and a controller. Also, the circuit unit 3000 may further include a power supply unit and a memory.

Although the optical apparatus A1 includes the beam steering device 1000 and the detector 2000 in FIG. 22, the beam steering device 1000 and the detector 2000 may be provided in separate apparatuses instead of being provided in one apparatus. Also, the circuit unit 3000 may be connected to the beam steering device 1000 or the detector 2000 through wireless communication, instead of by wire. A configuration of FIG. 22 may be modified in any of various ways.

The beam steering device according to the above example embodiments may be applied to any of various optical apparatuses. For example, the beam steering device may be applied to a light detection and ranging (LiDAR) apparatus. The LiDAR apparatus may be an apparatus using a phase-shift method or a time-of-flight (TOF) method. The LiDAR apparatus may be applied to an autonomous vehicle, a flying object such as a drone, a mobile device, a small vehicle (e.g., a bicycle, a motorcycle, a stroller, or a board), a robot, a human/animal assistive device (e.g., a cane, a helmet, an accessory, a garment, a watch, or a bag), an Internet of things (IoT) apparatus/system, or a security apparatus/system.

Figure 23:
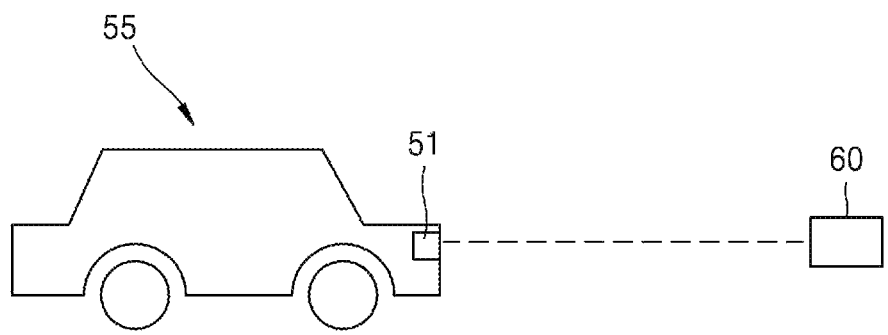
FIGS. 23 and 24 are conceptual views illustrating a case where a light detection and ranging (LiDAR) apparatus including an optical modulation device is applied to a vehicle according to an example embodiment.
Figure 24:
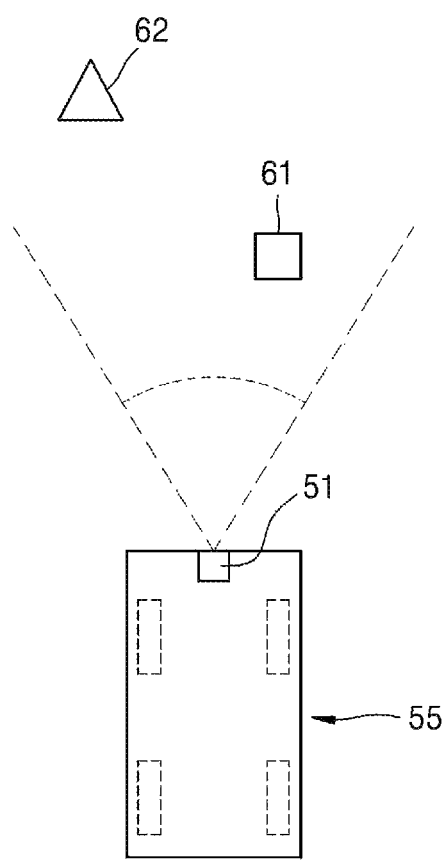

FIGS. 23 and 24 are conceptual views illustrating a case in which a LiDAR apparatus 51 including an optical modulation device is applied to a vehicle 55 according to an example embodiment. FIG. 23 is a side view and FIG. 24 is a top plan view.

Referring to FIG. 23, the LiDAR apparatus 51 may be applied to the vehicle 55, and information about an object 60 may be obtained by using the LiDAR apparatus 51. The vehicle 55 may be a vehicle having a self-driving function. The object 60, e.g., solid matter or a person, located in a direction in which the vehicle 55 travels may be detected by using the LiDAR apparatus 51. Also, a distance to the object 60 may be measured by using information such as a time difference between a transmission signal and a detection signal. Also, as shown in FIG. 24, information about a near object 61 and a far object 62 located within a scan range may be obtained.

The optical modulation device according to various example embodiments may be applied to any of various optical apparatus as well as the LiDAR apparatus. For example, since three-dimensional (3D) information of an object and a space may be obtained through scanning by using the optical modulation device according to various example embodiments, the optical modulation device may be applied to a 3D image acquisition apparatus or a 3D camera. Also, the optical modulation device may be applied to a holographic display apparatus and a structured light generating apparatus. Also, the optical modulation device may be applied to various beam scanning apparatuses, hologram generating apparatuses, optical coupling apparatuses, and various optical components/apparatuses such as varifocal lenses or depth sensors. Also, the optical modulation device may be applied to any of various fields using a "meta surface" or a "meta structure". In addition, the optical modulation device and the optical apparatus including the same according to example embodiments may be applied to any of various optical and electronic devices for any of various purposes.

Although many things have been described in detail, the example embodiments should not be construed as limiting the scope of the present disclosure, but rather should be interpreted as examples. For example, it will be understood by one of ordinary skill in the art that a configuration of the optical modulation device of any of FIGS. 1 through 3 and FIGS. 9 through 24 may be modified in any of various ways. It will also be understood that the optical modulation device according to the example embodiments may be applied to a transflective device or a transmissive device as well as a reflective device. Also, applications of the optical modulation device according to example embodiments are not limited thereto and may be modified in any of various ways. Accordingly, the scope of the present disclosure is defined not by the example embodiments but by the technical sprit and scope of the following claims.

What is claimed is:
1. An optical modulation device comprising:
    a driving circuit substrate;
    a plurality of reflectors located on the driving circuit substrate;
    a plurality of nano-antennas respectively located on the plurality of reflectors;
    an active layer located between the plurality of reflectors and the plurality of nano-antennas, wherein the active layer is patterned and thus comprises a plurality of openings therein;
    a first insulating layer located between the plurality of reflectors and the active layer;
    a second insulating layer located between the active layer and the plurality of nano-antennas;
    a plurality of first connection members which electrically connect the driving circuit substrate to the plurality of reflectors; and
    a plurality of second connection members which electrically connect the driving circuit substrate to the plurality of nano-antennas,
    wherein the plurality of second connection members are connected to the plurality of nano-antennas through the plurality of openings of the active layer,
    wherein the driving circuit substrate comprises a plurality of unit cell areas, and
    wherein each of the plurality of unit cell areas comprises at least one transistor and at least one capacitor.
2. The optical modulation device of claim 1, wherein the active layer is patterned into a line pattern comprising a plurality of line layers,
    wherein each of the plurality of openings is formed between adjacent ones of the plurality of line layers.
3. The optical modulation device of claim 1, wherein the active layer is patterned into a mesh pattern,
    wherein the plurality of openings are defined by the mesh pattern.
4. The optical modulation device of claim 1, wherein the active layer has a grid structure.
5. The optical modulation device of claim 1, wherein each of the plurality of unit cell areas comprises comprising two transistors and two capacitors.
6. The optical modulation device of claim 1, wherein each of the plurality of unit cell areas comprises a first sub-area and a second sub-area,
    wherein each first sub-area is connected to one of the plurality of reflectors, and each second sub-area is connected to one of the plurality of nano-antennas.
7. The optical modulation device of claim 6, wherein each first sub-area comprises one transistor and one capacitor, and each second sub-area comprises one transistor and one capacitor.
8. The optical modulation device of claim 1, wherein the driving circuit substrate comprises a plurality of unit cell areas, wherein each of the plurality of unit cell areas comprises one word line and two bit lines intersecting the one word line, wherein a first bit line of the two bit lines is electrically connected to one of the plurality of reflectors, and a second bit line of the two bit lines is electrically connected to one of the plurality of nano-antennas.

9. The optical modulation device of claim 1, wherein the active layer comprises a plurality of active regions, and a first reflector of the plurality of reflectors is located under a first active region of the plurality of active regions and a first nano-antenna of the plurality of nano-antennas is located over the first active region, wherein the first active region, the first reflector, and the first nano-antenna, together, constitute one unit device.

10. The optical modulation device of claim 9, comprising an array of the unit devices.

11. The optical modulation device of claim 9, wherein the optical modulation device is configured to independently apply a voltage to each of the first reflector and the first nano-antenna of the first active region, or independently apply a voltage to each of the first active region, the first reflector, and the first nano-antenna.

12. The optical modulation device of claim 1, wherein the optical modulation device is configured to independently apply a voltage to each of the plurality of reflectors, and to independently apply a voltage to each of the plurality of nano-antennas.

13. The optical modulation device of claim 1, wherein the optical modulation device is configured to induce a phase modulation of light reflected by the plurality of nano-antennas.

14. The optical modulation device of claim 1, wherein the active layer has a thickness equal to or less than 10 nm.

15. The optical modulation device of claim 1, further comprising a wiring structure electrically contacting the active layer and located in at least one of between the active layer and the first insulating layer and between the active layer and the second insulating layer, wherein the wiring structure has an electrical conductivity higher than an electrical conductivity of the active layer.

16. The optical modulation device of claim 1, wherein the active layer comprises an electro-optic material having a permittivity that varies according to an electrical signal applied to the active layer.

17. The optical modulation device of claim 1, wherein the active layer comprises at least one of a transparent conductive oxide and a transition metal nitride.

18. An optical apparatus comprising the optical modulation device of claim 1.

19. The optical apparatus of claim 18, wherein the optical apparatus is configured to steer a beam in a one-dimensional (1D) or two-dimensional (2D) manner by using the optical modulation device.

20. The optical apparatus of claim 18, wherein the optical apparatus comprises at least one of a light detection and ranging (LiDAR) apparatus, a three-dimensional (3D) image acquisition apparatus, a holographic display apparatus, and a structured light generating apparatus.

21. An optical modulation device comprising:
a driving circuit;
a plurality of reflectors;
a plurality of nano-antennas respectively located on the plurality of reflectors;
an active layer located between the plurality of reflectors and the plurality of nano-antennas;
a first insulating layer located between the plurality of reflectors and the active layer;
a second insulating layer located between the active layer and the plurality of nano-antennas;
a plurality of first connection members which electrically connect the driving circuit to the plurality of reflectors; and
a plurality of second connection members which electrically connect the driving circuit to the plurality of nano-antennas,
wherein the driving circuit comprises a plurality of unit cell areas, and each of the plurality of unit cell areas comprises one word line and two bit lines.

22. The optical modulation device of claim 21, wherein the active layer is patterned and thus comprises a plurality of openings therein, and the plurality of second connection members are connected to the plurality of nano-antennas through the plurality of openings.

23. The optical modulation device of claim 21, wherein each of the plurality of unit cell areas comprises a first sub-area and a second sub-area, wherein the first sub-area is connected to one of the plurality of reflectors, and the second sub-area is connected to one of the plurality of nano-antennas.

24. The optical modulation device of claim 23, wherein the first sub-area comprises at least one transistor and at least one capacitor, and the second sub-area comprises at least one transistor and at least one capacitor.

* * * * *